UNITED STATES PATENT OFFICE 2,505,744

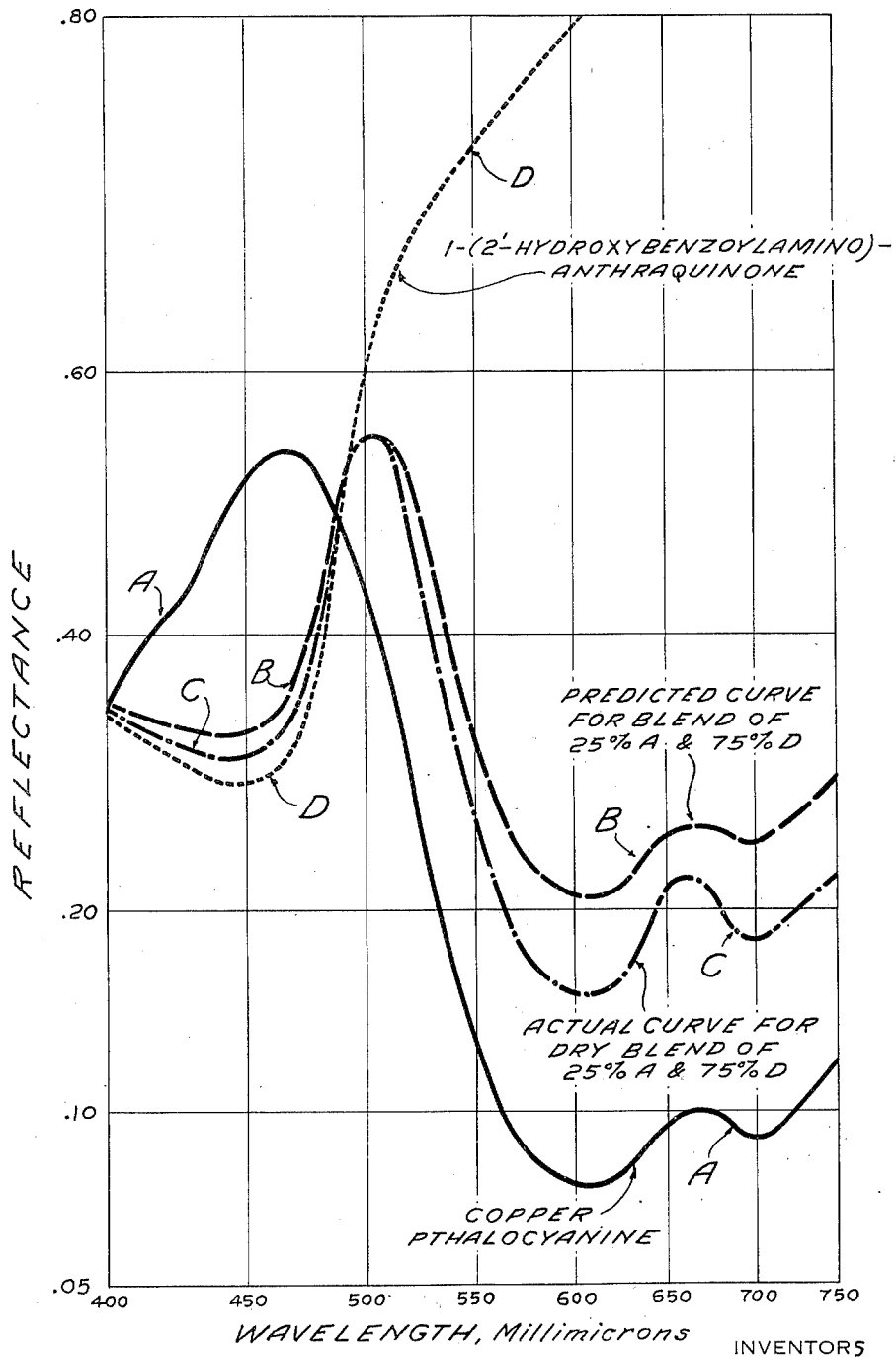

GREEN PIGMENT COMPOSITION

Mario Scalera and Robert E. Brouillard, Somerville, N. J., assignors to American Cyanamid Company, New York, N. Y., a corporation of Maine Application March 7, 1946, Serial No. 652,705

10 Claims. (Cl. 106—288)

This invention relates to green pigment compositions which are blends of chemically dissimilar blue and yellow organic pigments. The new compositions possess outstanding brilliance and color stability.

In the past the problem of obtaining green pigments has been a serious one. The green pigments known to the art suffer from one or more deficiencies. They are either expensive, dull and unattractive, have poor permanence to light or atmospheric contaminants prevalent particularly in seaboard and industrial areas, or have a fixed shade which cannot be changed to a different hue without impairing brilliance.

The green pigments now commercially available comprise Chrome Green, Chromium Oxide, Hydrated Chromium Oxide, highly chlorinated copper phthalocyanine and complex acid salts of green triphenylmethane dyes.

The triphenylmethane pigments are too fugitive for any outdoor use, while the highly chlorinated phthalocyanines are too expensive for use in tones deeper than a tint. Therefore the bulk of the green pigment market, particularly for paints, lacquers and durable inks, has been shared by Chrome Green and the Chromium oxides.

Chrome Green darkens on exposure to light and thus fades off-shade. Furthermore, its resistance to both acid and alkali is poor, its shade changing to dull yellow or blue under these agencies. Hydrated Chromium Oxide, which has better fastness, is deficient in tinctorial strength and grinding characteristics.

Green pigments have been prepared by blending copper phthalocyanine pigments and yellow azo pigments of the Hansa Yellow class. Such combinations are an improvement over some of the green pigments previously known to the art. They are, however, deficient in brilliance and of only moderate color stability. Dichlorobenzidine Yellow (3,3' - dichlorobenzidine→acetoacetanilide) may also be blended with copper phthalocyanine to give green pigments comparable to those obtained with the Hansa Yellows.

According to the present invention blue or greenish blue phthalocyanine pigments are blended with yellow pigments obtained by substituting the amino group of alpha amino anthraquinone by the radical of an aromatic carboxylic acid such as benzoic acid. These blends are brilliant green pigments of variable hue, excellent strength and stability to light and various atmospheric contaminants. The blended pigments of the present invention not only show excellent color strength and stability characteristics but they also exhibit a strength which is greater than that calculable from the individual pigment components themselves. It is not known why this unusual result is obtained and the present invention is not intended to be limited to any particular theory of action.

That the blending of phthalocyanine pigments with the particular alpha acylamino anthraquinones gives such surprisingly brilliant and strong pigments is contrary to the general experience of blending yellow vat dyes with phthalocyanines. Thus, for example, when phthalocyanines are blended with 1,2,5,6-anthraquinone-C-diphenyl dithiazole the resulting pigment, while green, exhibits inferior properties of color and stability. Similarly, when the phthalocyanine is blended with the bright yellow vat pigment 2,4,8,9-dibenzpyrene quinone dull green pigments of very inferior stability result. The production of bright green blends with phthalocyanines appears to be a unique characteristic of the alpha acylamino anthraquinones. The reasons why the improved results are obtained only with these particular yellow dyes are not known, and the invention is not intended to be limited to any theory of action.

It is an advantage of the present invention that the blending of the blue or greenish blue phthalocyanines with a yellow alpha acylamino anthraquinone may be effected by various methods and presents no critical problem. Thus, for example, dry blending may be used which is cheap and simple, but we prefer a wet blending of pre-conditioned pigments, for example, by acid pasting in sulfuric acid and coprecipitation in water. The coprecipitation produces yellower products which permits obtaining the same shade with reduced amount of the yellow pigment. As the alpha acylamino anthraquinones are in general more expensive, this method permits some saving in cost. On the other hand, dry blending or ordinary wet blending gives shades which are bluer and somewhat stronger.

The term pigment strength is used throughout this specification to refer to the tinting strength of the products when they are employed as pigments in coating compositions. If a colored pigment shows a high pigment strength after it has been blended with white pigment, then it can also be said to have a high tinting strength. The determination of pigment strength may be effected in various ways, for example, by a tristimulus method adopted by the International Commission of Illumination and described in the Journal of the Optical Society of America, vol. 23, page 359. In this method tristimulus luminous reflectance is a measure of strength. The higher the luminous reflectance the less the absorption of the pigment, and therefore the lower its strength. Another method is the Munsell system (Journal of Optical Society of America, vol. 33, page 385). In Munsell units a smaller value represents a stronger pigment.

It is possible both by the tristimulus and the Munsell method to calculate on the basis of the individual components what the strength of a blend should be. It is also possible by the use of spectrophotometric curves drawn on a recording flickering beam spectrophotometer provided with cams permitting the production of shape invariant with concentration to determine the theoretical strength of blends graphically. The comparison of predicted and actual blend strengths will be described in more detail in conjunction with the drawing, which shows spectrophotometric curves of copper phthalocyanine and of 1-(2'-hydroxybenzoylamino) anthraquinone, predicted curve for a blend of 25% of the first pigment and 75% of the second, and an actual curve of the same blend, all curves being taken on zinc oxide reductions made from the base inks of the respective pigments by conventional methods.

The following table illustrates the great increase in strength of the blends of the present invention as compared with predicted strength. Data is given both in tristimulus luminous reflectance values and Munsell units.

| Method of Blending | Tristimulus Luminous Reflectance | Munsell Units |
|---|---|---|
| Predicted | 31.11 | 6.09 |
| Dry Blend | 27.04 | 5.73 |
| Wet Blend | 27.54 | 5.78 |
| Co-acid Pasted Blend | 29.15 | 5.92 |

It will be apparent that considerably greater strength is obtained in the blends of the present invention than would be predicted from a color analysis of the components. The increased strength may be interpreted in terms of effective amounts of pigments. Thus, for example, when the 75-25% blend is compared with the predicted value its effective strength is equivalent to that which would be predicted for 85 parts of the yellow pigment and 38 parts of the blue pigment, representing an increase in efficiency of 13% for the yellow and 38% for the blue.

The surprising increase in strength is obtained without sacrificing other desirable characteristics. In fact, the blend also has other improved characteristics, particularly as respects grinding characteristics. It is well known that copper phthalocyanine is a hard pigment which disperses only with difficulty in organic vehicles and requires dispersing agents. The blend with the alpha acylamino anthraquinone is a soft pigment which will disperse easily in organic vehicles without any dispersing agent. It is not known why the anthraquinone compound should so greatly influence the physical form of the phthalocyanine and no theoretical explanation is intended to limit the scope of the present invention.

While it is an advantage of the present invention that the soft blend may be dispersed in organic vehicles without using a dispersing agent, the invention is, of course, not limited thereto, and on the contrary, if desired, dispersing agents may be used.

Among the alpha acylamino anthraquinones useful in blends of the present invention may be mentioned the following: 1-(2'-hydroxybenzoylamino) anthraquinone, 1-(2'-nitrobenzoylamino) anthraquinone, 1-(4'-nitrobenzoylamino) anthraquinone, 1-(2'-chlorobenzoylamino) anthraquinone, 1-(4'-chlorobenzoylamino) anthraquinone, 1-(3',4'-dichlorobenzoylamino) anthraquinone, 1-(furoylamino) anthraquinone. It is also possible to use alpha acylamino anthraquinones in which there is a substituent on the anthraquinone rings so long as this is a non-auxochromic group. Thus, for example, 1-benzoylamino-6-chloroanthraquinone or 1-benzoylamino-5-nitro anthraquinone may be used. Other aroyl derivatives of alpha amino anthraquinone have also been found useful. These are naphthoyl, anthroyl, and derivatives of di- and polycarboxylic acids of the aromatic series, such as isophthalic acid di-(alpha-anthraquinonyl) amide, terephthalic acid di-(alpha-anthraquinonyl) amide, p,p'-diphenyl dicarboxylic acid di-(alpha-anthraquinonyl) amide, trimesic acid tri-(alpha-anthraquinonyl) amide and the like.

The above compounds may be easily prepared by heating the alpha amino anthraquinone and the corresponding aromatic acid chloride in an inert solvent.

It is possible to use commercially available acylamino anthraquinones and they need not be prepared from highly purified alpha amino anthraquinones. However, maximum brilliance is obtained when highly pure alpha amino anthraquinone is used in the production of the acylamino anthraquinones. Such highly purified alpha amino anthraquinones may be prepared, for instance, from phthalimido anthraquinones by methods known to the art.

Among the blue to green phthalocyanines (tetrabenzo tetrazaporphines) copper phthalocyanine is the most common and is preferred. However, other metal phthalocyanines, such as nickel, cobalt, zinc, etc., may be used, as can metal free phthalocyanine, as well as the nuclear halogen substitution products of the phthalocyanines.

The invention will be described in greater detail in conjunction with the following examples. The parts are by weight.

EXAMPLE 1

One part of copper phthalocyanine and five parts of 1-(2'-hydroxy benzoylamino) anthraquinone was dissolved in 92 parts of 98% sulfuric acid at 10–15° C. When solution was complete, the mixture was drowned into 400 parts of flaked ice and 600 parts of water with vigorous stirring. The precipitated pigment was removed by filtration, washed acid-free and dried at 65–70° C.

The product is a soft, fluffy, green pigment which disperses easily into Litho Varnish and is suitable for incorporation into paints, enamels, lacquers, printing inks etc. When compared with Medium Chrome Green by the method of ASTM Standards 1944, p. 900, it showed 200% strength, a darker and brighter masstone, a much brighter undertone, less bronze, and a much brighter shade.

The product has durability characteristics superior to Chrome Green; thus, in a typical ink formulation the new product showed only a slight break after 103 Fade-Ometer hours while the Chrome Green had become much bluer.

EXAMPLE 2

When 5 parts of 1-(2'-hydroxy benzoylamino) anthraquinone and 0.5 part of copper phthalocyanine blue are co-acid pasted as described in Example 1 a product is obtained with properties similar to those described in Example 1, but yellower in hue.

When compared with Chrome Green (Light) this green pigment was 286% as strong, had a much darker masstone, a much brighter undertone, less bronze and a bluer and brighter shade.

EXAMPLE 3

Part A 20 parts of copper phthalocyanine was dissolved in 280 parts of 98% sulfuric acid at 50–55° C. 40 parts of xylene was added to the solution and the mixture stirred until sulfonation of the xylene was complete. The mixture was then drowned into 400 parts of ice and 600 parts of water with vigorous stirring. The aqueous pigment slurry which resulted was filtered and the cake washed successively with water until acid-free, with 500 parts of 1% sodium carbonate, and again with water until alkali-free.

One-half of the product was dried at 65–70° C. The other half was kept as a wet paste.

Part B 20 parts of 1-(2'-hydroxybenzoylamino) anthraquinone was acid-pasted in 280 parts of 98% sulfuric acid at 10–15° C. The mixture was worked up as described in Part A.

One-half of the product was dried at 65–70° C. The other half was kept as a wet paste.

Part C 2.5 parts of dry copper phthalocyanine from Part A and 7.5 parts of dry 1-(2'-hydroxybenzoylamino) anthraquinone from Part B were thoroughly blended.

Part D 2.5 parts of copper phthalocyanine (as pulp) from Part A and 7.5 parts of 1-(2'-hydroxybenzoylamino) anthraquinone (as pulp) from Part B were thoroughly blended and the mix dried at 65–70° C. The pigments of Parts C and D were of bright green shade and had properties comparable to the product of Example 1.

EXAMPLE 4

5 parts of copper phthalocyanine was dissolved in 150 parts of conc. $H_2SO_4$ at 50–55° C. The solution was cooled to 15–20° C. and 2.5 parts of 1-benzoylaminoanthraquinone was added. The mixture was stirred until solution was complete and then drowned into 400 parts of ice and 600 parts of water.

The aqueous slurry of green pigment which resulted was filtered and the cake washed successively with water until acid-free, with 500 parts of 1% $Na_2CO_3$, and again with water until alkali-free. The product was dried at 65–70° C.

The pigment thus produced is an attractive dark green shade and had properties comparable to the pigment of Example 1.

EXAMPLE 5

Example 4 was duplicated using 5 parts of copper phthalocyanine and 7.5 parts of 1-benzoylaminoanthraquinone.

The pigment thus produced is an attractive light-green shade and has properties comparable to the pigment of Example 1.

EXAMPLE 6

2.5 parts of copper phthalocyanine was dissolved in 150 parts of conc. $H_2SO_4$ at 50–55° C. The solution was cooled to 15–20° C. and 2.5 parts of 1-(2'-chlorobenzoylamino) anthraquinone added. The mixture was worked up as in Example 4.

The pigment thus produced has an attractive dark-green shade and properties comparable to the pigment of Example 1.

EXAMPLE 7

2.5 parts of copper phthalocyanine and 7.5 parts of the condensation product of isophthalyl chloride and 1-aminoanthraquinone were co-acid pasted by the method described in Example 4. The product was a bright green pigment of properties comparable to those of the product of Example 1.

EXAMPLE 8

2.5 parts of metal-free phthalocyanine and 7.5 parts of 1-(2'-hydroxybenzoylamino) anthraquinone were co-acid pasted according to Example 4, but keeping the temperature at 0–5° C. The product was a bright green pigment of properties comparable to those of the product of Example 1.

EXAMPLE 9

2.5 parts of nickel phthalocyanine and 7.5 parts of 1-(2'-hydroxybenzoylamino) anthraquinone were co-acid pasted according to Example 4. The product was a bright green pigment of properties comparable to those of the product of Example 1.

EXAMPLE 10

2.5 parts of monochloro copper phthalocyanine and 7.5 parts of 1-(2'-hydroxybenzoylamino) anthraquinone were co-acid pasted according to Example 4. The product was a bright green pigment of properties comparable to those of the product of Example 1.

EXAMPLE 11

5 parts of a highly chlorinated copper phthalocyanine prepared according to Example 1 of U. S. P. 2,247,752 and 7.5 parts of 1-(2'-hydroxybenzoylamino) anthraquinone were co-acid pasted according to Example 4. The product was a bright yellow-green pigment of exceptional fastness properties.

We claim:

1. A green pigment composition having as its only essential color constituent a blend of a blue to green phthalocyanine pigment and a yellow alpha aromatic acylamino anthraquinone, the proportions being from 90 to 33% of the anthraquinone pigment and 10 to 66% of the phthalocyanine pigment.

2. A green pigment composition having as its only essential color constituent a blend of copper phthalocyanine and yellow alpha aromatic acylamino anthraquinone, the proportions being from 90 to 33% of the anthraquinone pigment and 10 to 66% of the phthalocyanine pigment.

3. A green pigment composition having as its only essential color constituent a blend of copper phthalocyanine and 1-benzoylamino anthraquinone, the proportions being from 90 to 33% of the anthraquinone pigment and 10 to 66% of the phthalocyanine pigment.

4. A green pigment composition having as its only essential color constituent a blend of copper phthalocyanine and 1-(2'-hydroxybenzoylamino) anthraquinone, the proportions being from 90 to 33% of the anthraquinone pigment and 10 to 66% of the phthalocyanine pigment.

5. A green pigment composition having as its only essential color constituent a blend of copper phthalocyanine and isophthalic acid di-(alpha-anthraquinonyl) amide, the proportions being from 90 to 33% of the anthraquinone pigment and 10 to 66% of the phthalocyanine pigment.

6. A method of preparing green pigment blends which comprises acid pasting a blue to green phthalocyanine pigment and a yellow alpha aromatic acylamino anthraquinone, and coprecipitating a blend of the pigment with water, the proportions being from 90 to 33% of the anthraquinone pigment and 10 to 66% of the phthalocyanine pigment.

7. A method of preparing green pigment blends which comprises acid pasting copper phthalocyanine and a yellow alpha aromatic acylamino anthraquinone, and coprecipitating a blend of the pigment with water, the proportions being from 90 to 33% of the anthraquinone pigment and 10 to 66% of the phthalocyanine pigment.

8. A method according to claim 7 in which the alpha aromatic acylamino anthraquinone is 1-benzoylamino anthraquinone.

9. A method according to claim 7 in which the alpha aromatic acylamino anthraquinone is 1-(2'-hydroxybenzoylamino) anthraquinone.

10. A method according to claim 7 in which the alpha aromatic acylamino anthraquinone is isophthalic acid di-(alpha anthraquinonyl) amide.

MARIO SCALERA.
ROBERT E. BROUILLARD.

REFERENCES CITED

The following references are of record in the file of this patent:

UNITED STATES PATENTS

| Number | Name | Date |
| --- | --- | --- |
| 2,091,102 | Peck | Aug. 24, 1937 |
| 2,167,514 | Jones | July 25, 1939 |
| 2,332,636 | Hose | Oct. 26, 1943 |

OTHER REFERENCES

Mattiello: Protective and Decorative Coatings, vol. II, pages 108 and 283.